Patented July 4, 1933

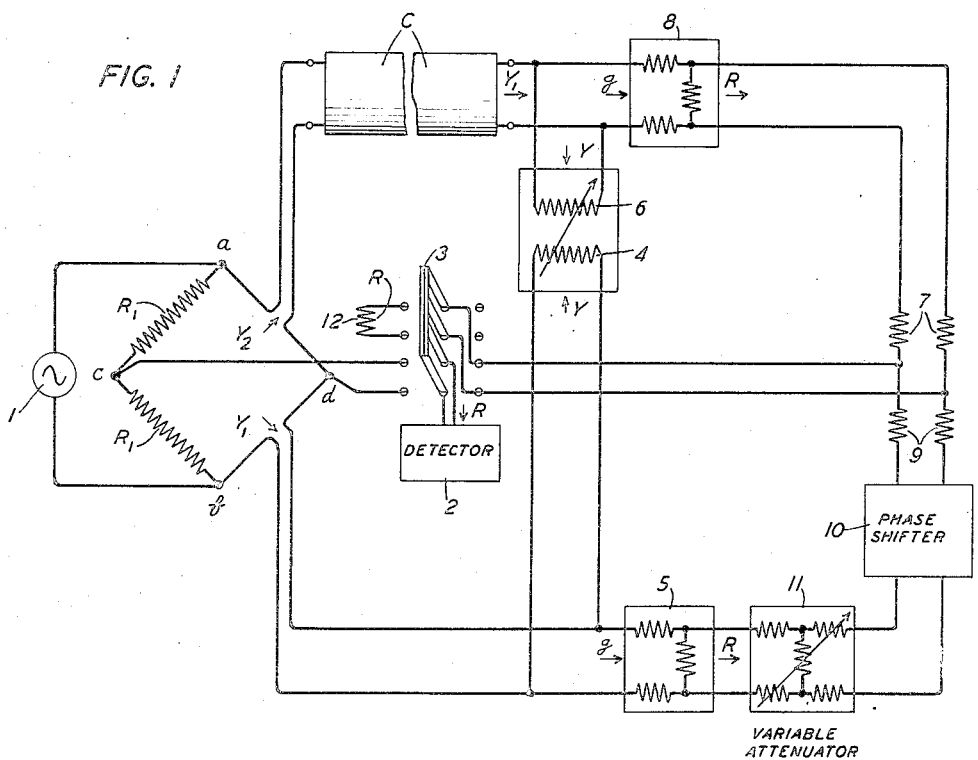
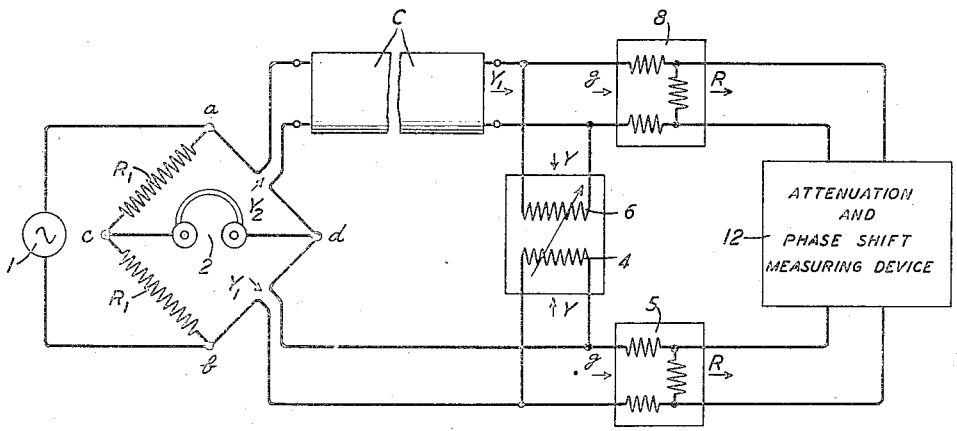

1,916,231

UNITED STATES PATENT OFFICE

HENRY G. OCH, OF NEW YORK, AND FOSTER A. HINSHAW, OF ST. ALBANS, NEW YORK, ASSIGNORS TO BELL TELEPHONE LABORATORIES, INCORPORATED, OF NEW YORK, N. Y., A CORPORATION OF NEW YORK

MEASUREMENT OF ELECTRICAL CHARACTERISTICS OF TRANSMISSION CIRCUITS AND NETWORKS

Application filed August 26, 1932. Serial No. 630,518.

This invention relates to electrical testing and particularly to measurement of the electrical characteristics of transmission circuits and apparatus.

An object of the invention is to simplify the measurement of certain electrical characteristics of transmission circuits and apparatus.

In the study and design of electrical circuits and apparatus, it is often desirable to determine quickly and accurately the electrical characteristics thereof under different conditions of operation, for example, the propagation constant and iterative impedance of a telephone line or cable at certain frequencies and temperatures. In the past, it has been customary to determine the latter characteristics indirectly by utilizing Wheatstone bridge circuits to measure the open circuit and short circuit impedance between the branches of the line or cable at one terminal when the branches at the other terminal are open or short-circuited, and to compute from these measurements the fundamental constants R, L, G and C. The propagation constant and iterative impedance are then computed from these fundamental constants by well known formulæ. These calculations require considerable time and effort before the desired results are obtained.

In accordance with the present invention, the measurement of the electrical characteristics of transmission circuits and apparatus is simplified and computation work substantially eliminated by the use of special measuring circuits which give directly readings of the iterative impedance and the propagation constant of the circuit being measured. In one embodiment, the measuring circuit of the invention is a unitary device comprising an impedance bridge and a transmission measuring bridge. In obtaining the iterative impedance, two impedance standards are varied in unison, one terminating the circuit or network the characteristics of which are to be measured and which is connected in one arm of a Wheatstone bridge, and the other balancing the circuit or network input impedance and connected in another arm of the bridge. When the bridge is balanced the value of the latter standard is that of the iterative impedance of the circuit or network and the circuit or network is effectively terminated in its iterative impedance. With the circuit or network terminated in its iterative impedance, measurements of insertion loss and phase shift by apparatus connected to the bridge will obtain directly the real and imaginary components of the propagation constant.

The invention may be more readily understood by reference to the following detailed description in connection with the drawing in which:

Figs. 1 and 2 show schematically different modifications of the invention.

The measuring circuit of the invention shown in Fig. 1 includes a Wheatstone bridge circuit having four arms $ac$, $bc$, $bd$ and $ad$. The arms $ac$ and $bc$ comprise two fixed equal resistances $R_1$. The arm $bd$ comprises the variable impedance network 4. The arm $ad$ comprises a section of cable C the characteristics of which are to be measured terminated in the variable impedance network 6. The source of measuring current 1 is connected to the terminals $a$ and $b$ of the bridge and a detector 2, which may be a telephone receiver or meter with or without auxiliary amplifying means, is adapted to be connected across the terminals $c$ and $d$ of the bridge by means of the switch 3 when thrown to the left.

Two of the terminals of a four-terminal resistance pad 8 are connected to the cable C across the variable impedance network 6. Two of the terminals of another four-terminal resistance pad 5 having identical electrical characteristics as the resistance pad 8 are connected to the arm $bd$ of the bridge across the variable impedance network 4. The variable impedance networks 4 and 6 are arranged so that their values may be varied in unison.

When the switch 3 is thrown to the right, the detector 2 is connected to the output terminals of the resistance pad 8 through the series resistances 7, and to the output terminals of the resistance pad 5 through the series resistances 9, the phase shifter 10 and the variable attenuator 11. When the switch 3 is thrown to the left, the output terminals of the resistance pad 8 are connected through the series resistances 7 to the terminating resistance 12, and the output terminals of the pad 5 are connected through the variable attenuator 11, the phase shifter 10, and the series resistances 9 also to the terminating resistance 12. The values of the series resistances 7 and 9, that of the terminating resistance 12 and the input impedance of the detector 2 are chosen so that the resistance pads 8 and 5 are always terminated in their proper resistance R.

The phase shifter 10 may be of any of the well known types of the prior art but is preferably of the lattice type, similar to those disclosed in the Nyquist Patents Nos. 1,675,460, issued July 3, 1928, 1,732,311 issued October 22, 1929, 1,770,422, issued July 15, 1930, or 1,735,052, issued November 12, 1929. The variable attenuator 11 is preferably of the variable H resistance type such as disclosed, for example, in Vennes Patent 1,472,507 issued October 30, 1923.

A method of operation of the circuit of Fig. 1 for determining the iterative impedance and propagation constant of the cable C will now be described.

The iterative impedance of a circuit, such as a telephone cable, or a network may be defined as follows: when the output terminals of the circuit or network are connected to an impedance of such a value that the same impedance appears at the input terminals of the circuit or network, the circuit or network is said to be terminated in its iterative impedance. The propagation constant of a circuit or network may be defined as the natural logarithm of the complex ratio of the input and output currents of the circuit or network when terminated in its iterative impedance.

The iterative impedance is first determined in the following manner. The switch 3 is thrown to the left so as to connect the detector 2 across the terminals $cd$ of the Wheatstone bridge, and alternating current of the desired frequency is transmitted to the bridge from the source 1. Then the values of the cable terminating variable impedance network 6 and the standard impedance network 4 connected to the arm $bd$ of the bridge are varied in unison until the Wheatstone bridge is balanced, which condition is indicated by a reading of minimum current in the detector 2. When this condition is attained, the admittance $Y_1$ of the arm $bd$ of the bridge comprising the admittance $Y$ of the impedance network 6 plus the conductance $g$ of the pad 5, the admittance $Y_2$ at the input of the cable C, and the cable terminating admittance $Y_1$ comprising the admittance $Y$ of the variable impedance network 6 plus the conductance $g$ of the resistance pad 8 are all equal to each other and to the iterative admittance of the cable $Y_k$. The value of the iterative admittance $Y_k$ of the cable C may be obtained then from the following equation by substituting therein the known conductance $g$ of the pads 5 and 8, and the admittance $Y$ read from the dial of the network 6 or 4.

$$Y_1 = Y_2 = Y + g = Y_k$$

iterative admittance of cable C (1)

The value of the iterative impedance $Z_k$ of the cable, which is equal to $$\frac{1}{Y_k},$$

may then be computed from the reading on the dial of the impedance network 4 or 6 if properly calibrated.

Leaving the setting of the variable impedance network 6 in the position attained in the above described manner, that is, so that the cable C is terminated effectively in its iterative impedance, the value of the propagation constant may be determined in the following manner.

The switch 3 is thrown to the right so as to disconnect the detector 2 from the bridge and the terminating resistance 12 from the circuit leading to the output of the resistance pad 8 and to the output of the phase shifter 10, and to connect the detector 2 to the output of the resistance pad 8 and the output of the phase shifter 10 through the series resistances 7 and 9, respectively. Then the variable attenuator 11 and the phase shifter 10 are adjusted until a minimum current is detected by the detector 2. Then, the value of the attenuation constant $\alpha$ and that of the phase constant B of the cable can be read directly from the dials of the variable attenuator 11 and the phase shifter 10, respectively. The propagation constant P of the cable may then be determined by substituting these values in the equation:

$$P = \alpha + jB \quad (2)$$

It is realized that in measuring the iterative impedance, the sensitivity of the balance is dependent largely upon the propagation constant of the cable. A network with a very low propagation constant is practically transparent, and the terminating impedance will show through to the input terminal of the cable almost unchanged. Inasmuch as the standard impedance connected in the bridge arm $bd$ is always equal to the cable terminating impedance, the bridge will be nearly balanced for any value of the latter impedance. The result, of course, is an insensitive balance and an inaccurate measurement. However, it is merely necessary to know the actual bridge sensitivity and the approximate propagation constant in order to determine whether or not the measurement of the iterative impedance of the cable will be as precise as desired. A mathematical analysis of the circuit of Fig. 1 shows the resultant error in measuring the iterative impedance to be:

$$\rho = \frac{(1-r) \pm \sqrt{(1-r)^2 + 4r\rho_1^2}}{-2r\rho_1} \quad (3)$$

where $$\rho = \frac{Z_k - Z_s}{Z_k + Z_s} = \text{the error expressed as reflection coefficient}; \quad (4)$$

$\rho_1$ = sensitivity of bridge balance expressed as reflection coefficient; (5)

$$r = e^{-2p} \quad (6)$$

$Z_k$ = Actual cable iterative impedance;  $Z_s$ = Iterative impedance as read directly from standards. (7)

If the computed error is too great, the proper procedure would be to connect a number of sections of cable or networks in tandem so that the propagation constant for the group is sufficiently large to obtain the sensitivity and accuracy of balance required. Such procedure will also make for more accurate attenuation and phase measurements.

The measuring circuit of Fig. 1 is particularly adapted for measuring the transmission characteristics of short lengths of cable or networks where the propagation constant is relatively small. Where the transmission characteristics of longer lengths of cables or of networks having a relatively large propagation constant are to be measured, the modified measuring circuit of Fig. 2 will give better results.

The circuit of Fig. 2 differs from that of Fig. 1 essentially only in the following particulars. The detector 2, shown as a telephone receiver, which is connected permanently across the diagonal cd of the Wheatstone bridge, is used in connection with the determination of the iterative impedance of the cable C only, and has no function in connection with the determination of the propagation constant of the cable. For the purpose of determining the propagation constant of the cable, an attenuation and phase shift measuring device 12 of any one of the well known types is connected between the output of the resistance pad 8 and the output of the resistance pad 6 in place of the phase shifter 10 and the variable attenuator 11 used in the system of Fig. 1.

One attenuation and phase shift measuring device which would be suitable for use in connection with the measuring circuit of Fig. 2 would be that disclosed in Fig. 1 of W. P. Mason Patent 1,684,403 issued September 18, 1928. If the latter device is used in the system of Fig. 2, the terminals to the left of the resistance 11 in the Mason device would be connected to the output of the resistance pad 8 in the system of Fig. 2 of this application, and the input terminals of the variable attenuator 6 in the Mason device would be connected to the output terminals of the resistance pad 6 in the system of Fig. 2 of this application. The attenuation constant and the phase constant of the cable C may then be determined in the manner described in the specification of the Mason patent, and the propagation constant P of the cable computed by inserting the values found in equation (2) as given above.

Although the measuring circuits of the invention have been specifically described as applied to the measurement of the electrical characteristics of a cable, they are applicable as well to the measurement of electrical characteristics of circuits and electrical networks of any kind, for example, filters and the like.

Although in the measuring circuits illustrated in Figs. 1 and 2 the variable impedance elements 6 and 4 have been illustrated as resistances, these elements may in practice comprise reactive elements as well as resistances depending on the particular characteristics of the cable or network being measured. For example, in the case of the measurement of a telephone cable, these impedances may comprise series resistance and condenser elements, resistances in parallel with condensers, resistances in series with inductances or inductances in parallel with resistances, the value of each of which elements is adapted to be varied to the desired degree.

Various modifications of the circuits of the invention other than those illustrated and described, which are within the spirit and scope of the invention, will be apparent to persons skilled in the art.

What is claimed is:

1. The method of determining the propagation constant of an electrical circuit which consists in first measuring the iterative impedance of said circuit, effectively terminating said circuit in its iterative impedance, and then measuring the attenuation and phase shift produced in electrical waves transmitted through said circuit so terminated to obtain the real and imaginary components of the propagation constant.

2. A system for measuring the iterative impedance of an electrical circuit comprising a Wheatstone bridge having two fixed resistance arms, a third arm comprising a variable impedance network, a fourth arm comprising said electrical circuit terminated by a second variable impedance network, a source of alternating current waves connected to a diagonal of said bridge, and a detector responsive to the unbalance current of said bridge, means for adjusting in unison the value of the impedance of the circuit terminating impedance network and that of said variable impedance network to balance the bridge when alternating current waves from said source are supplied thereto, and means for indicating at the balance point, the value of said second variable impedance network, which corresponds to the value of said iterative impedance.

3. The method of determining the propagation constant of a given electrical circuit at certain frequencies which consists in first measuring the iterative impedance of said circuit for said frequencies, effectively terminating said given circuit in its iterative impedance, transmitting electrical waves of said frequencies through a combination circuit comprising in tandem said given circuit so terminated, and an electrical network having a definite attenuation and phase shift characteristic, and through an auxiliary network normally having the same attentuation and phase shift characteristic as the first network, varying the attenuation and phase shift of said auxiliary network until the amplitude of the waves in its output is substantially equal to that of the waves in the output of said combination circuit, and then determining the resultant change in attenuation and phase shift in said auxiliary network to obtain the real and imaginary components of the propagation constant of said electrical circuit.

4. A system for measuring the electrical characteristics of a transmission circuit comprising a Wheatstone bridge having two equal resistance arms, a third arm comprising said transmission circuit and a variable impedance network terminating said circuit, a fourth arm comprising a second variable impedance network, means for supplying current to a diagonal of the bridge and a detector responsive to the unbalance current of the bridge connected to the other diagonal thereof, two four-terminal resistance networks of identical electrical characteristic, one having two of its terminals connected to said transmission circuit across its terminating impedance network, and the other having two of its terminals connected to said fourth bridge arm across said second variable impedance network, means for adjusting the values of said terminating and said second variable impedance network in unison to balance said bridge, the transmission circuit at the balance point being effectively terminated in its iterative impedance and the value of said second network at that point indicating said iterative impedance, and circuit means connected to the other two terminals of said one four-terminal network and the other two terminals of said other four-terminal network for determining by a null method the attenuation and phase constants of the propagation constant of said transmission circuit.

5. A system for measuring the electrical characteristics of a transmission circuit, comprising a Wheatstone bridge having two equal resistance ratio arms, a third ratio arm comprising said circuit and a variable impedance network terminating said circuit, a fourth ratio arm comprising a second variable impedance network, a source of alternating current waves connected to a diagonal of said bridge, and a current detector adapted to be connected to the other diagonal of the bridge to indicate the unbalance current therein, two four-terminal electrical networks of identical electrical characteristic, one having two of its terminals connected to said transmission circuit across its terminating variable impedance network and the other having two of its terminals connected to a fourth arm of said bridge across said second variable impedance network, a variable attenuator, a phase shifter, means to adjust in unison the values of said terminating variable impedance network and said second variable impedance network to balance said bridge, said transmission circuit when said bridge is balanced being effectively terminated in its iterative impedance, and the value of said second variable impedance network indicating the value of said iterative impedance, means for connecting said detector through one branch circuit to the other two terminals of said one four-terminal network, and through another branch circuit including said variable attenuator and said phase shifter to the other two terminals of said other four-terminal network so that the detector indicates the difference between the output currents of said one and said other branch currents when current from said source is applied to said bridge, means for adjusting said attenuator and said phase shifter until minimum current is indicated by said detector, and means for indicating at the minimum current point the value of said variable attenuator and said phase shifter to obtain an indication of the real and imaginary components, respectively, of the propagation constant of said transmission circuit.

In witness whereof, we hereunto subscribe our names, this 18th day of August, 1932.

HENRY G. OCH.
FOSTER A. HINSHAW.